Sept 3, 1957 R. A. ROAD 2,805,403
INTERCHANGEABLE TERMINAL CONSTRUCTION FOR METERS
Filed Jan. 17, 1956 2 Sheets-Sheet 1
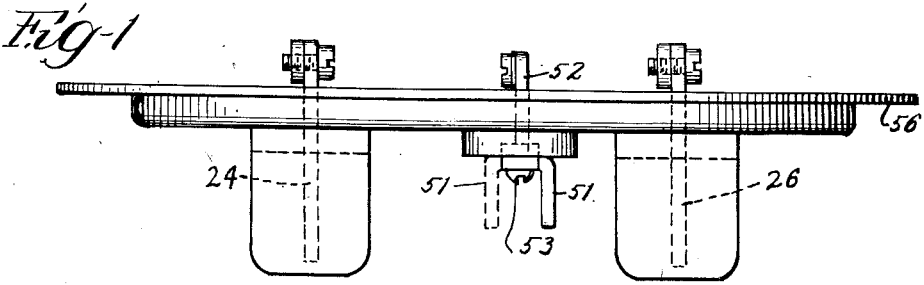
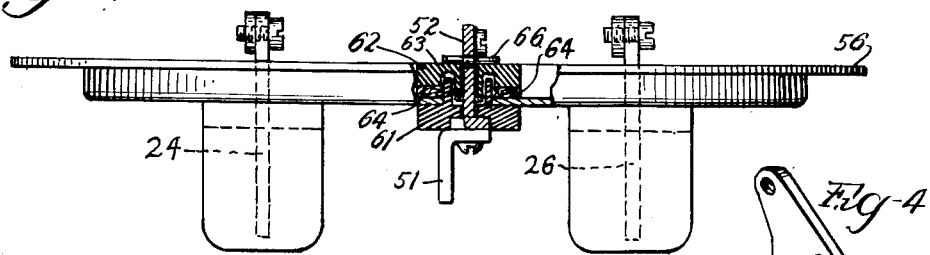
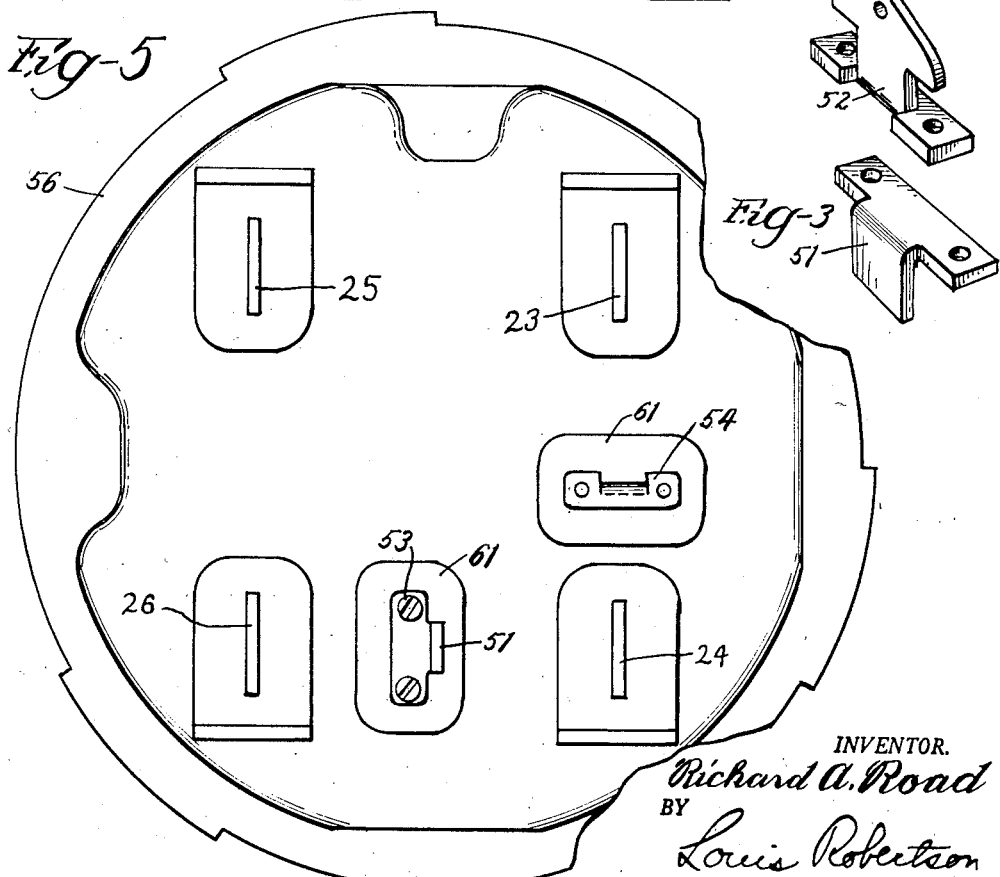
INVENTOR.
Richard A. Road
BY
Louis Robertson
Atty.

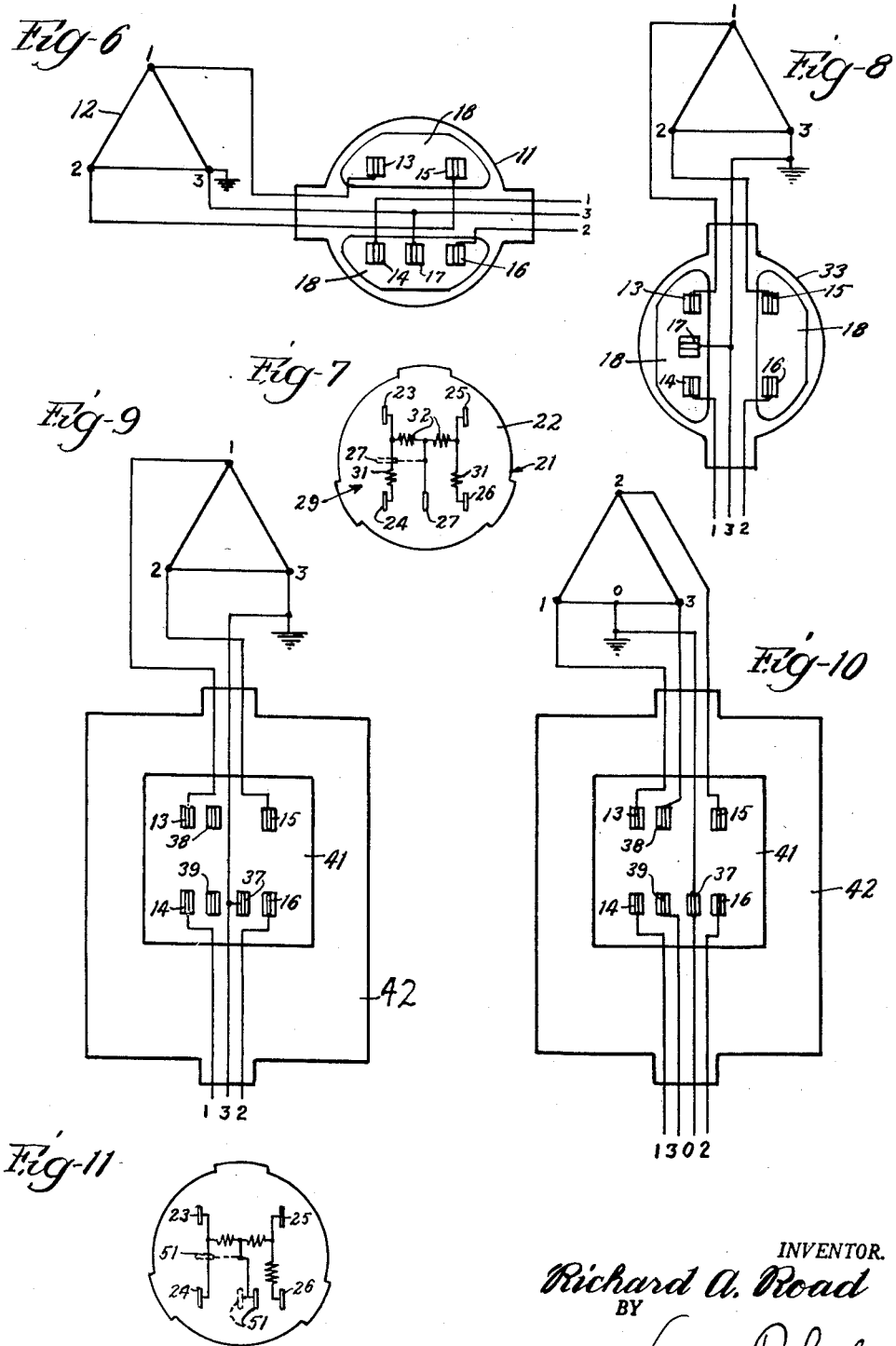

United States Patent Office 2,805,403
Patented Sept. 3, 1957

2,805,403

INTERCHANGEABLE TERMINAL CONSTRUCTION FOR METERS

Richard A. Road, West Lafayette, Ind., assignor, by mesne assignments, to Duncan Electric Company, Inc., Lafayette, Ind., a corporation of Indiana Application January 17, 1956, Serial No. 559,554

3 Claims. (Cl. 339—31)

The constantly increasing use of electricity has resulted in expanding needs for more complex metering facilities. One group of watthour meters now common, and to which this invention especially relates, is known as "five-terminal socket meters."

Socket-type meters commonly are mounted on base plates on the backs of which are exposed projecting terminal blades, by which the meter may be "plugged in" on its socket. Ten years ago the ordinary home would have had a simple four-terminal meter, the four terminals being positioned at the corners of a rectangle. Now five-terminal meters are increasingly common, five terminals being needed for 3-wire, 3-phase service, which is now almost a minimum in most light industry and commercial installations, or even in homes, if there is central air conditioning.

There has been increasing recognition that many of these five-terminal meters will have to be replaced sooner or later by seven-terminal meters for 4-wire service. Four-wire service is needed to supply satisfactorily both 110–120 v. lighting and polyphase motors of the 220 v. range.

As the distribution and metering industries have developed, five-terminal meters have the 5th terminal centered between two of the main terminals, while seven-terminal meters have the extra terminals positioned differently, namely, on lines approximately one-third of the distance between the positions of two of the old four main terminals, so that along one row four terminals will be nearly evenly spaced.

There has been a recommendation that the fifth terminal be shifted off-center to fit the seven-terminal sockets, so that seven-terminal sockets can be installed but now wired for five-terminal meters, thus facilitating the ultimate replacement by seven-terminal meters, when four-wire service is needed. It has been recognized that for a long period this will present an undesirable situation, in which there will be two non-interchangeable types of five-terminal meters, until the present centered fifth terminals have disappeared from use.

According to the present invention, these awkward years of lack of interchangeability of five-terminal meters are avoided while the advantages of preparing for ready replacement by seven-terminal meters is attained. This is accomplished by providing a very simple and satisfactory shiftable fifth terminal at no appreciable extra cost. It is merely necessary to mount the present fifth terminal (or one substantially like it) by screws which are located midway between the present centered position and the non-centered position used in the seven-terminal meters. By merely removing the screws and turning the terminal about, it may be shifted to fit either type of socket.

This is far preferable to providing an adapter or a replacement terminal. Spare parts would then have to be stocked and would not always be at hand when needed. The same terminal can also be shifted to a different side of the base plate for a five-terminal meter used with vertical wiring. This, again, is advantageous in not requiring a different kind of terminal.

Additional objects and advantages of the invention will be apparent from the following description and from the drawings.

*Designation of figures*

Fig. 1 is an edgewise view of a watthour meter base plate for socket meters, embodying the preferred form of this invention.

Fig. 2 is a view similar to Fig. 1 but showing the interchangeable terminal reversed in position, and broken away to show some parts in cross section.

Figs. 3 and 4 are perspective views of parts seen in Fig. 2.

Fig. 5 is a view of the rear side of the base plate shown in Figs. 1 and 2, the side here seen being at the bottom in Figs. 1 and 2. Fig. 5 appears to represent a left-to-right reversal, as compared to Figs. 1 and 2.

Figs. 6 to 10 are diagrammatic illustrations of circuit requirements which make the present invention necessary, Fig. 7 representing a meter and the other figures representing socket or connecting facilities.

Fig. 11 is a view corresponding to Fig. 7 but indicating the meter of the present invention.

In Figs. 7 and 11, the terminal blades have been shown in full lines for simplicity, even though the blade portions thereof would be on the far side of the base plate.

Although the invention itself is seen best in Figs. 1 to 5, its need and its use can best be explained with reference to Figs. 6 to 10.

Although the law requires a full and exact description of at least one form of the invention, such as that which follows, it is, of course, one purpose of a patent to cover each new inventive concept therein, no matter how it may later be disguised by variations in form or additions of further improvements; and the appended claims are intended to accomplish this purpose by particularly pointing out the parts, improvements, or combinations in which the inventive concepts are found.

*Circuit descriptions*

Fig. 6 represents a conventional horizontal wiring of a meter socket 11 for a five-terminal meter. Five-terminal meters are required in connection with three-phase current supplies, represented by the delta 12. Supply conductors 1, 2 and 3 from the supply 12 extend into the socket 11 from one side, while corresponding load conductors 1, 2 and 3 extend out through a hub on the opposite side. Within the socket 11 are provided main terminal clamps 13, 14, 15 and 16, and a fifth terminal clamp 17, all mounted on insulators 18.

Fig. 7 diagrammatically represents a meter carried by base plate 21, which may be plugged into the socket 11. Terminal blades 23 to 27 would be thrust into terminal clamps 13 to 17 respectively. Most commonly, the terminal clamps 13 to 17 are in the form of sturdy springs which make firm connections with the terminal blades 23 to 27 as they are thrust between the spring leaves of the clamp. In some heavy-duty installations, screw clamps are used in place of the spring-terminal clamps 13 to 17. In any event, the meter includes a meter element 29 which through the terminal clamps and terminal blades becomes connected in the circuit. Within the meter element, heavy conductors, including current coils 31, form the main paths for the load currents. Thus, one of these load coils 31 is connected between terminal clamps 13 and 14, so that supply conductor 1 is connected to load conductor 1. Likewise, the other current coil 31 is connected between terminal clamps 15 and 16, so that supply conductor 2 is connected to load conductor 2. According to well-known principles of metering, the main current of conductor 3 need not pass through the meter, and hence this conductor may extend through the socket without interruption. However, it must be connected to the potential coils 32, and this is accomplished by means of terminal clamp 17 and terminal blade 27. It is with interchangeability of the facilities for making this connection that this invention is particularly concerned.

The terminal blade 27 has heretofore commonly been interchangeable for the vertical wiring shown in Fig. 8. In circuit wires, this figure is the same as Fig. 6. Structurally, it is different, in that the socket 33 has its hubs vertically disposed and its insulator blocks 18 correspondingly angularly rotated. Terminal clamps 13 to 17 are connected as before. The main terminal clamps 13 to 16 must be turned about their axes on the insulating blocks 18, so as to still be positioned to receive vertical terminal blades 23 to 26. This adaptability has been worked out long before this and is not a part of this invention. For physical reasons, including convenience of mounting on an insulator block 18, the terminal clamp 17 is now positioned as shown in Fig. 8. This necessitates being able to shift terminal blade 27 on the back of the meter base plate 22 to the new position, so that it will engage terminal clamp 17. This also has been worked out heretofore and has long been standard practice.

According to the practice long standard, terminal clamps 17 have always been centered between two of the main terminal clamps, and hence the meters designed for five-terminal sockets have all had their blades 27 positioned in such a centered position. However, there has long been another type of socket meter and mounting using seven terminals. The connector clamps and connections for this type of meter are represented in Fig. 10. Here it is seen that, in addition to the four "corner" terminal clamps corresponding to the main terminal clamps of Figs. 6 and 8, and therefore given the same numbers in Fig. 10, there are three additional terminal clamps. There is a potential terminal clamp 37 corresponding to the terminal clamp 17 of Figs. 6 and 8, but located in an off-center position. This off-center position is used because of the presence of two additional main terminal clamps 38 and 39, which serve to connect main supply conductor 3 through the meter to main load conductor 3. This is necessary because it is used on a four-wire circuit. These clamps have been shown mounted on a rectangular insulating block 41, positioned in a large rectangular box 42, since that is the more common practice with four-wire circuits.

Prior to the present invention, there has been recognition that the standard practice of using centered potential terminal in five-terminal meters is disadvantageous, because it necessitates expensive changes when a three-wire service is changed to a four-wire service. It is not possible simply to make an interchange of a seven-terminal meter for the five-terminal meter, but the terminal clamp assemblies must also be interchanged. This has become an increasing annoyance with the increasing numbers of installations that had to be converted for four-wire from three-wire circuitry. There has been a serious proposal prior to this invention to start manufacturing the five-terminal meters with off-center potential terminals.

There has been a great reluctance to start manufacture of five-terminal meters with off-center potential terminals, because of the tremendously high number of centered potential terminal sockets already in use. It has been recognized to be highly undesirable for five-terminal meters manufactured hereafter not to be interchangeable with five-terminal meters manufactured heretofore. Nevertheless, forward-looking meter engineers have urged that the changeover problem from three-wire to four-wire is becoming more and more important and that the sooner the break is made the better. There has even been a proposal to provide an adapter to enable a five-terminal meter with an off-center terminal blade to be connected to sockets with centered potential terminal clamps. This is not an entirely satisfactory solution of the problem, because it is objectionable to require adapters. There is not only the nuisance of cost of having to maintain a supply, but there would always be times when the adapter would not be at hand when needed and a trip would have to be made for one.

According to the present invention, the problem is solved in a thoroughly satisfactory manner by providing a five-terminal construction which can be manufactured at virtually no additional unit cost and which, without any additional parts being required, is completely interchangeable for all the purposes above discussed. The preferred form of this new five-terminal meter construction is shown in Figs. 1 to 5. A key feature of the invention is in providing an L-shaped potential terminal blade 51 secured to a terminal post 52 by screws 53 positioned in a plane midway between the two desired positions of the terminal blade 51. Thus, with the terminal blade positioned as shown in full lines in Fig. 1, it is correctly positioned for the seven-terminal terminal clamp assembly. By merely removing the screws 53 and reversing the L-shaped terminal blade 51 to the dotted-line position shown in Fig. 1 and reapplying the screws 53, the terminal blade 51 will be in the centered position suitable for use with all present five-terminal terminal clamp assemblies.

As seen in Fig. 5, a second terminal post 54 identical to the terminal post 52, is provided, to which the potential terminal blade 51 may be shifted whenever the meter is to be used with the vertical wiring of Fig. 8.

This construction represents no additional cost as compared to the present construction, because the present construction also includes two terminal posts identically like posts 52 and 54, one for horizontal wiring of Fig. 6 and the other for vertical wiring of Fig. 8, and between which a single terminal blade may be shifted as required. The simplicity of the present invention is indicated by the fact that the only changes necessary to manufacture the meters of this invention are to shift a slight distance laterally the position of the holes through the metal base plate 56 through which the two terminal posts 52 and 54 are mounted and to substitute a simple L-shaped terminal blade 51 for the present potential terminal blade which may be described as T-shaped, the screws securing the present potential terminal blade being in the plane of the blade.

With the present invention, meters can be manufactured with the centered potential terminal blade as shown in Fig. 2. They will thus be usable for all present standard five-terminal sockets. Whenever an organization installing such meters thinks that there is a likelihood of changing to a four-wire circuit at a particular location, the terminal clamp facilities and circuit connections indicated in Fig. 9 can be provided, and the same five-terminal meters may be installed at such a location merely by reversing the L-shaped terminal blade 51, so that its projecting blade portion will be in the correct off-centered position for the potential terminal clamp in this assembly.

The structure of Fig. 9 can be identical with that of Fig. 10 except that the terminal clamps 38 and 39 will remain idle, Fig. 9 being a three-wire circuit. Of course, the terminal clamps 38 and 39 can be omitted from the insulator block 41 if desired, and supplied only when a four-wire circuit is needed. Perhaps it will be more common to provide the terminal clamps 38 and 39 initially. In fact, it will be a common practice to string the wires for the four-wire circuit, at least, if early conversion is anticipated, and simply leave idle the wires connected to terminal clamps 38 and 39.

Thus, the meter manufactured in accordance with this invention is represented in Fig. 11. Here the four terminal blades 23 to 26 are the same as in Fig. 7, and would be plugged in to main terminal clamps 13 to 16. Terminal blade 51 is of the construction shown in Figs. 1 to 5, and therefore may be positioned in the full-line position shown in Fig. 11, for engagement with terminal clamp 37 of Fig. 9, or in either of the dotted-line positions for connection with the terminal clamp 17 in either the Fig. 6 position or the Fig. 8 position.

Although there is believed to be no confusion in sometimes using the expression "terminal blade" for the entire L-shaped member 51 and sometimes using it for only the projecting leg thereof, the latter can be distinguished when desired by calling it the blade body.

The details for mounting and insulating the terminal posts 52 and 54 are no more than incidentally a part of this invention, the same details having been used with the center positioned posts. Nevertheless, a cross section of the structure is shown in Fig. 2. The post 52 extends through telescoping insulating collars 61 and 62. The outer telescoping flange 63 positions the assembly in the whole through metal plate 56. A slightly compressed felt washer 64 serves as a dust seal and draws the insulating collar 61 snugly against the rear face of plate 56. The assembly is held together by a cotter pin passing through terminal post 52 and resting on insulating collar 62.

Instead of posts similar to the posts 52 and 54, some other form of mounts for the L-shaped terminal blades could be used.

I claim:

1. A base plate and terminal blade construction for watthour meters of the socket type, including a base plate, electroconductive terminal blades positioned at the four corners of a rectangle and extending through the base plate in non-conductive relationship thereto and projecting rearwardly therefrom for being thrust into terminal clamps correspondingly arranged in a terminal clamp assembly, an electroconductive terminal post extending through the plate at a position intermediate to two said terminal blades along one side of said rectangle, said terminal post having a substantially flat mounting face with threaded apertures therein facing rearwardly of said plate, and an L-shaped terminal blade, having a base portion secured against said mounting face by screws extending through the base portion and into said threaded apertures and having a blade body projecting approximately perpendicularly from said base in a rearward direction to be thrust into a terminal clamp correspondingly positioned in the terminal clamp assembly, said L-shaped terminal blade being reversible between two positions by removal of said screws, and said threaded apertures being so positioned that in one of the terminal blade positions the blade body is centered between the two adjacent main terminal blades while in the other of said positions the blade body is offset from said centered position by twice the distance between said centered position and said screws.

2. A base plate and terminal blade construction for watthour meters of the socket type, including a base plate, electroconductive terminal blades positioned at the four corners of a rectangle and extending through the base plate in non-conductive relationship thereto and projecting rearwardly therefrom for being thrust into terminal clamps correspondingly arranged in a terminal clamp assembly, an electroconductive terminal mount carried by the plate at a position intermediate to two said terminal blades along one side of said rectangle, said terminal mount having threaded apertures therein facing rearwardly of said plate, and an L-shaped terminal blade, having a base portion secured against said mount by screws extending through the base portion and into said threaded apertures and having a blade body projecting approximately perpendicularly from said base in a rearward direction to be thrust into a terminal clamp correspondingly positioned in the terminal clamp assembly, said L-shaped terminal blade being reversible between two positions by removal of said screws, and said threaded apertures being so positioned that in one of the terminal blade positions the blade body is centered between the two adjacent main terminal blades while in the other of said positions the blade body is offset from said centered position by twice the distance between said centered position and said screws.

3. A base plate and terminal blade construction for socket-type watthour meters according to claim 2, in which a second terminal mount similary is mounted on the base plate but along an adjacent side of said rectangle at a position correspondingly spaced from the center thereof, so that the same L-shaped terminal blade may be applied thereto with its blade body centered between the two adjacent main terminal blades.

No references cited.